US010118804B2

(12) United States Patent
Van Den Brink

(10) Patent No.: US 10,118,804 B2
(45) Date of Patent: Nov. 6, 2018

(54) DEVICE FOR CARRYING FLAT OBJECTS

(71) Applicant: VACUUM LIFTING HOLLAND BEHEER B.V., Kootwijkerbroek (NL)

(72) Inventor: Steven Van Den Brink, Kootwijkerbroek (NL)

(73) Assignee: Vacuum Lifting Holland Beheer B.V., Kootwijkerbroek (NL)

( * ) Notice: Subject to any disclaimer, the term of this patent is extended or adjusted under 35 U.S.C. 154(b) by 0 days.

(21) Appl. No.: 15/566,198

(22) PCT Filed: Apr. 11, 2016

(86) PCT No.: PCT/NL2016/050247
§ 371 (c)(1),
(2) Date: Oct. 12, 2017

(87) PCT Pub. No.: WO2016/167647
PCT Pub. Date: Oct. 20, 2016

(65) Prior Publication Data
US 2018/0141785 A1 May 24, 2018

(30) Foreign Application Priority Data
Apr. 13, 2015 (NL) ...................................... 1041269

(51) Int. Cl.
*B66C 1/02* (2006.01)
*B65G 49/06* (2006.01)

(52) U.S. Cl.
CPC .......... *B66C 1/0243* (2013.01); *B65G 49/061* (2013.01); *B65G 49/067* (2013.01); *B66C 1/0281* (2013.01); *B65G 2249/045* (2013.01)

(58) Field of Classification Search
CPC ....... B66C 1/0243; B66C 1/0281; B66C 1/02; B66C 1/0237; B65G 49/061; B65G 49/067; B65G 2249/045; F16L 39/04
(Continued)

(56) References Cited

U.S. PATENT DOCUMENTS 3,704,038 A * 11/1972 Glanemann ............. B66C 1/025
294/65
4,121,865 A * 10/1978 Littwin, Sr. ........... B66C 1/0218
294/186

(Continued)

FOREIGN PATENT DOCUMENTS

DE 202010004853 U1 * 8/2010 ........... B65G 49/061
GB 2197927 A * 6/1988 ........... B63B 22/021
(Continued)

*Primary Examiner* — Gabriela M Puig
(74) *Attorney, Agent, or Firm* — Adler Pollock & Sheehan P.C.; Daniel J. Holmander, Esq.

(57) ABSTRACT

Device (1) for carrying an object (2) having a smooth surface, which device comprises a first frame (3) that is arranged to be able to manipulate the device and the object to be carried, as well as a second frame (5) onto which a number of suction cups (6) is attached. The second frame is planar rotatably with respect to the first frame. Furthermore a number of vacuum sources (8, 9) is provided for evacuating the suction cups. The vacuum sources and suction cups are interconnected by means of at least one spiral-shaped hose assembly (10) of which the hoses (11), each being connected to a vacuum source (8) and a suction cup (6), are in the same spiral plane (14).

3 Claims, 1 Drawing Sheet

(58) Field of Classification Search
USPC .......... 294/65, 188, 183, 185; 414/627, 737
See application file for complete search history.

(56) References Cited

U.S. PATENT DOCUMENTS

| | | | | |
|---|---|---|---|---|
| 4,279,544 A | * | 7/1981 | Brun | ................... B63B 35/4406 |
| | | | | 166/346 |
| 9,061,868 B1 | * | 6/2015 | Paulsen | ................. B66C 1/0218 |
| 2015/0098781 A1 | * | 4/2015 | Moore | .................. B66C 1/0256 |
| | | | | 414/589 |

FOREIGN PATENT DOCUMENTS

| | | | | |
|---|---|---|---|---|
| WO | WO-0069771 A1 | * | 11/2000 | ........... B66C 1/0212 |
| WO | WO-2013169544 A1 | * | 11/2013 | ....... H01L 21/67736 |

* cited by examiner

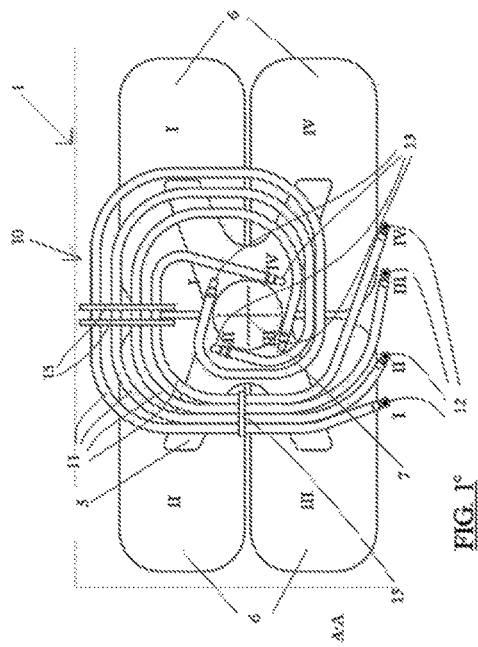
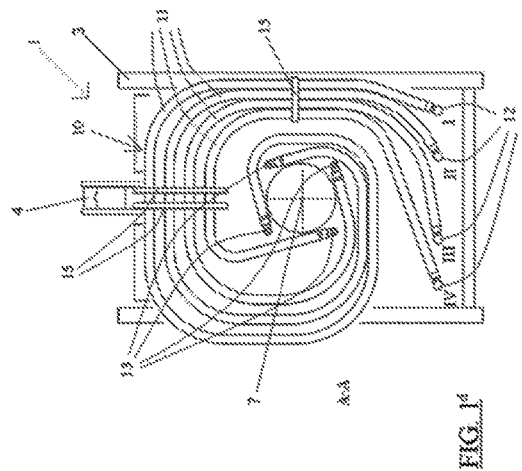
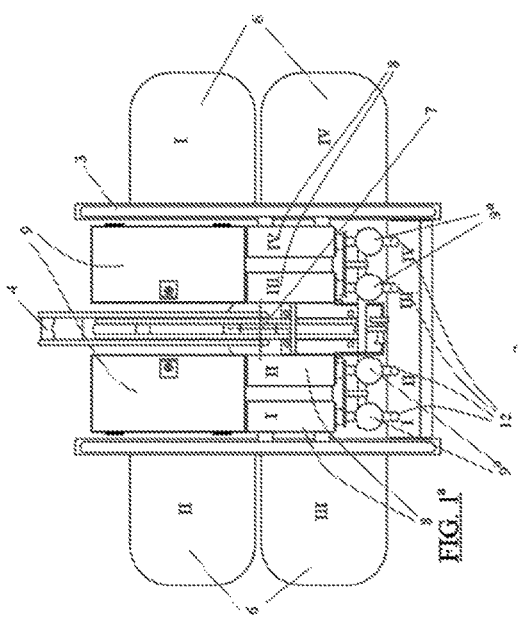
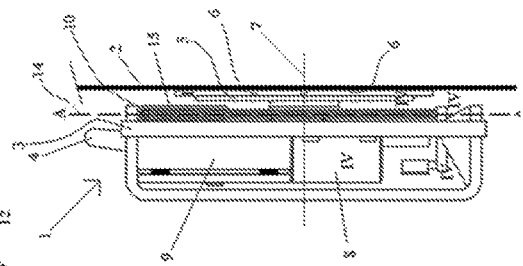
FIG. 1a
FIG. 1b
FIG. 1c
FIG. 1d ature filing under 35 U.S.C.
DEVICE FOR CARRYING FLAT OBJECTS

CROSS REFERENCE TO RELATED APPLICATIONS

This application is a national phase filing under 35 U.S.C. § 371 of International Application No. PCT/NL2016/050247 filed Apr. 11, 2016, which claims priority from The Netherlands application number 1041269, filed Apr. 13, 2015, the entire contents of which is hereby incorporated by reference herein.

The invention relates to a device for carrying an object having a smooth, flat surface, for example a panel or a sheet of glass. Such a device may comprise a first frame, which is arranged to be able to manipulate the device and the object to be carried, for example, for hoisting by a crane. Furthermore, a second frame may be provided, onto which a number of suction cups is attached, wherein the second frame is rotatable around an axis of rotation relative to the first frame in a plane that extends parallel to the smooth surface of the object to be carried. The ability to planarly rotate the object allows for the object—for example a (optionally large) sheet of glass—to be correctly positioned inside a window frame. A number of—one or more—vacuum sources is provided for emptying (evacuating or draining) the suction cups during operation. The vacuum sources and the suction cups are pneumatically interconnected by means of a pneumatic connecting member, which is rotatable around the axis of rotation.

Generally because of security reasons, two vacuum sources are provided and a same amount of separate pneumatic circuits and suction cups or suction cup groups. Usually two vacuum sources are used (often a vacuum pump with two vacuum tanks) and two groups of suction cups, which are interconnected by means of two connecting channels. A well-known configuration comprises two groups of suction cups, each group containing two suction cups (i.e. four suction cups in total), wherein the four suction cups are arranged in a square and wherein the opposed arranged suction cups always constitute one group, and are connected to the same vacuum source.

Upon failure of one of the two vacuum circuits (e.g. caused by leakage), then the entire load (e.g. the sheet of glass) must be carried by the only remaining suction cup group, of which the suction cups are usually located opposite to each other. Consequently, each vacuum circuit including the suction cups should be designed to safely carry the entire load, in the event of failure of the other vacuum circuit. Therefore in fact all components (in particular the suction cups) are dimensioned twice as strong and heavy as that would be required without such (legitimate) security requirements. The consequence is that the present devices are relatively large and heavy and therefore relatively expensive.

A solution can be found by using, for example, six suction cups—and as a consequence providing three vacuum circuits—instead of four (two times two) suction cups. In case of failure of one vacuum circuit, the remaining two circuits must be designed to be able to carry the entire load. This means that each circuit only needs to be 50% overdesigned, instead of 100% overdesigned by using two separate circuits.

In numbers: when a power of 100 units is needed for carrying a certain load, due to safety reasons a power of two times 100 units=200 units is required for a system with two separate circuits, which both must be able to carry the whole load in case of failure of one circuit. If a system comprises three separate circuits (each with two suction cups for example) and one circuit fails, the remaining two circuits must carry the whole load, and together must supply the power of 100 units. Consequently each circuit must deliver a power of 50 units or %. In total, all (three) circuits must therefore have a power of 3*50=150 units instead of 200 units in a version with two separate circuits.

Further, in order to improve clarity, is explained that the lifting capacity of the device is essentially determined by the total surface area of the active suction cups, and essentially not by the contents of the vacuum tank(s), and only to a limited extent by the capacity of the vacuum pump(s), which will provide for adequate underpressure in the vacuum tank(s). Generally, the lifting capacity is determined at a vacuum level of 60%. This is a lower limit: below this limit the alarm goes off. At sea level, vacuum pumps achieve an average of 70% vacuum.

In case of failure of one circuit when applying four separate circuits, wherein three of them together are able to carry the entire load, the resulting power per circuit is 33.3 units (100/3). Consequently the total summed up power to be delivered by the entire device must be 4*33.3=133.3 units, if the safety requirements are to be fulfilled.

Advantageously, more separate circuits are used and provided, due to the lower total power to be delivered and required (150 and 133.3 respectively instead of 200 units) and due to the associated smaller size, the lower weight and lower costs. However, hereby a technical problem must be overcome, that will be discussed in the next paragraph and for which the present invention offers a solution.

Due to the planar rotatability of the suction cups, mounted in the above described second frame (onto which the suction cups are mounted), a member needs to be provided, which ensures that a multiple (twofold for two separate circuits) rotatable pneumatic connection is to be effected between said rotatable second frame with its two groups of suction cups, and the "fixed" first frame, onto which the (internal or external) vacuum sources or vacuum circuits (directly or indirectly) are attached.

Currently in well-known devices, turnbuckle-shaped members are used for this purpose. However, the construction of these turnbuckle-shaped members is such that the distance, transverse to the common plane of the suction cups and of the smooth surface of the load to be carried, increases with the number of separate circuits, caused by the basic principle of the structure of such a turnbuckle-shaped member, wherein the rotatable channels in that turnbuckle-shaped member are stacked, so to speak. As a result, in a system with two separate circuits, the turnbuckle-shaped member and therefore the distance between the first (fixed) and the second (rotatable) frame has such a value, that the entire device, that is the construction of the first and second frame held together by the rotatable turnbuckle-shaped member, additional to a rotatable mechanical connection, should also provide for two rotatable pneumatic communication channels, leading to a complicated construction, which is expensive and susceptible to faults when the turnbuckle-shaped member should contain three or more pneumatic connecting channels instead of two.

Object of the present invention is therefore to overcome this problem by providing a device of the above mentioned type, wherein the pneumatic connecting member is not formed by a turnbuckle-shaped member, but at least by one spiral-shaped hose assembly of which the hoses each at one end are connected to a vacuum source and at the their other end are connected to at least one suction cup, and wherein essentially all the hoses are located in one and the same spiral plane (in other words, a "planar spiral").

It is apparent and will become clear from the description of the FIGURE hereinafter, that in this way e.g. four vacuum sources are connected to four suction cups (or suction cup groups). By applying a "planar spiral hose assembly" the built-in depth of the entire device essentially remains limited to the thickness of one hose (after all, the hoses are all situated in one and the same plane) plus, if necessary, hose protection and/or guide means.

Although, by using the hereinbefore proposed hose system, the rotation angle is limited to a maximum of 90° for example, in practice however hardly any problems are encountered, when positioning panels, glass panes etcetera.

Hereinafter, the invention will be discussed in more detail with reference to some exemplary embodiments, with reference to some figures.

FIGS. 1a-d show an embodiment of the invention with four separate pneumatic circuits with a front view, a side view and a cross-sectional view over the spiral hose to the front and the back respectively.

Of the embodiment discussed below, FIG. 1a shows the front view, FIG. 1b shows the side view, FIG. 1c shows a cross-sectional view A-A as seen in the direction of the backside, where the suction cups are located, and FIG. 1d shows a cross-sectional view A-A as seen in the direction of the front side of the device.

According to an embodiment of a device 1 for carrying an object 2 having a smooth surface, the device 1 comprises a first frame 3, which is adapted to be able to manipulate the device 1 and the object 2, for example by suspending the device on a lifting crane or other manipulator by means of a lifting eye 4. Furthermore, a second frame 5 is provided, onto which a number of suction cups 6 is attached.

The second frame 5 is planar rotatably about a rotation axis 7, with respect to the first frame 3, in a plane which is parallel to that of the smooth flat surface of the object to be carried (in other words, the axis of rotation is substantially perpendicular oriented with respect to the plane of the smooth surface of the object 2, on which the suction cups 6 engage).

Furthermore, a plurality of vacuum sources is provided, constituted by four vacuum tanks 8 with associated pump(s), regulating and control means 9, for draining (evacuating) by pumping the suction cups 6 during operation. The four vacuum sources 8 and the four suction cups 6 are pneumatically interconnected to each other by means of a pneumatic connecting member, which can be rotated around the axis of rotation 7. According to the invention, the pneumatic connecting member is formed by a planar spiral-shaped hose assembly 10 of which the (four) hoses 11 each at one end 12 are connected to one of the four vacuum tanks 8, and at its other end 13 are connected to one of the suction cups 6. All the hoses 11 are located in the same spiral plane 14 (A-A), which is transversely oriented with respect to the axis of rotation 7. By using a "planar spiral hose assembly" the mounting depth of the entire configuration is determined by the thickness of one hose (after all, the hoses are all situated in one and the same plane) plus the hose protection and/or the hose guiding means 15.

The device shown in FIGS. 1a-d comprises four separate pneumatic circuits, each comprising a suction cup (or possibly a group of suction cups) 6, and a vacuum source 8 (vacuum tank in which the vacuum is provided by one or more vacuum pumps) for pumping out (draining or evacuating) of the thereto connected suction cup (or suction cups) 6 during operation, wherein each of the pneumatic circuits comprises one hose 11, which is part of the spiral-shaped hose assembly 10. The components of the four separate pneumatic circuits have been indicated in the FIGS. 1a-d with I, II, III and IV.

With regard to the implementation of the vacuum source the following observations are noted, for purposes of illustration. The units 9 shown in FIG. 1a include switch cabinets containing batteries, a central vacuum pump, connected by means of check valves with the four vacuum tanks 8, vacuum sensors, the system controller etc. The vacuum tanks 8 are part of the units 9, which tanks lead to and flow into valves with vacuum gauges 9a provided with connections (I, II, III, IV) for the hoses 11. The proposed structure is the most logical, because dirt and water always want to move downwards so that the check valves, sensors and vacuum pump(s) are optimally protected.

Therefore according to the invention, a device is provided for carrying an article or object having a smooth, flat surface, which object can be vertically, planarly rotated. In order to increasing safety, without the device becoming unnecessarily heavy, large, expensive and constructive complicated, the device is provided with a planar rotatable connection (having an axis of rotation 7) with a plurality (four in the embodiment) planar rotatable pneumatic connecting channels that are constructional simple and reliable, because they are designed as a planar spiral-shaped hose assembly.

Finally it is noted, that instead of a single planar spiral hose assembly 10, the device may also be provided with more than one, for example two, planar spiral hose assemblies, wherein the hoses are positioned in two parallel spiral planes, for example. By applying two planar spiral hose assemblies, for example, which are located in two parallel spiral planes, the installation depth of the entire device will be doubled, however, with respect to the use of one planar spiral hose assembly.

The invention claimed is:

1. Device for carrying an object having a smooth surface, which device comprises a first frame that is arranged to be able to manipulate the device and the object to be carried, as well as a second frame onto which a number of suction cups is attached,
    wherein the second frame is rotatable about an axis of rotation relative to the first frame in a plane that extends parallel to the smooth surface of the object to be carried,
    wherein furthermore a plurality of vacuum sources is provided for evacuating the suction cups during operation, and wherein the vacuum sources and the suction cups are pneumatically interconnected by means of a pneumatic connecting member, which is rotatable about said axis of rotation,
    characterized in that the pneumatic connecting member is formed by at least one spiral-shaped, multiple hose assembly comprising a plurality of parallel hoses and hose guiding means, wherein each hose at one end is connected to a vacuum source and at its other end is connected to at least one suction cup, and wherein for each spiral-shaped multiple hose assembly all hoses by means of the hose guiding means are located in one spiral plane.

2. Device according to claim 1, comprising a number of separate pneumatic circuits, each comprising a suction cup or group of suction cups and a vacuum source for evacuating a suction cup or suction cups connected thereto during operation, wherein each of the pneumatic circuits comprises at least one hose, which is part of the at least one spiral-shaped multiple hose assembly.

3. Device according to claim 2, comprising two or more, preferably three, and more preferably four pneumatic circuits.

\* \* \* \* \*